C. H. BLOMSTROM.
DRIVING MECHANISM FOR MOTOR VEHICLES.
APPLICATION FILED AUG. 11, 1915.

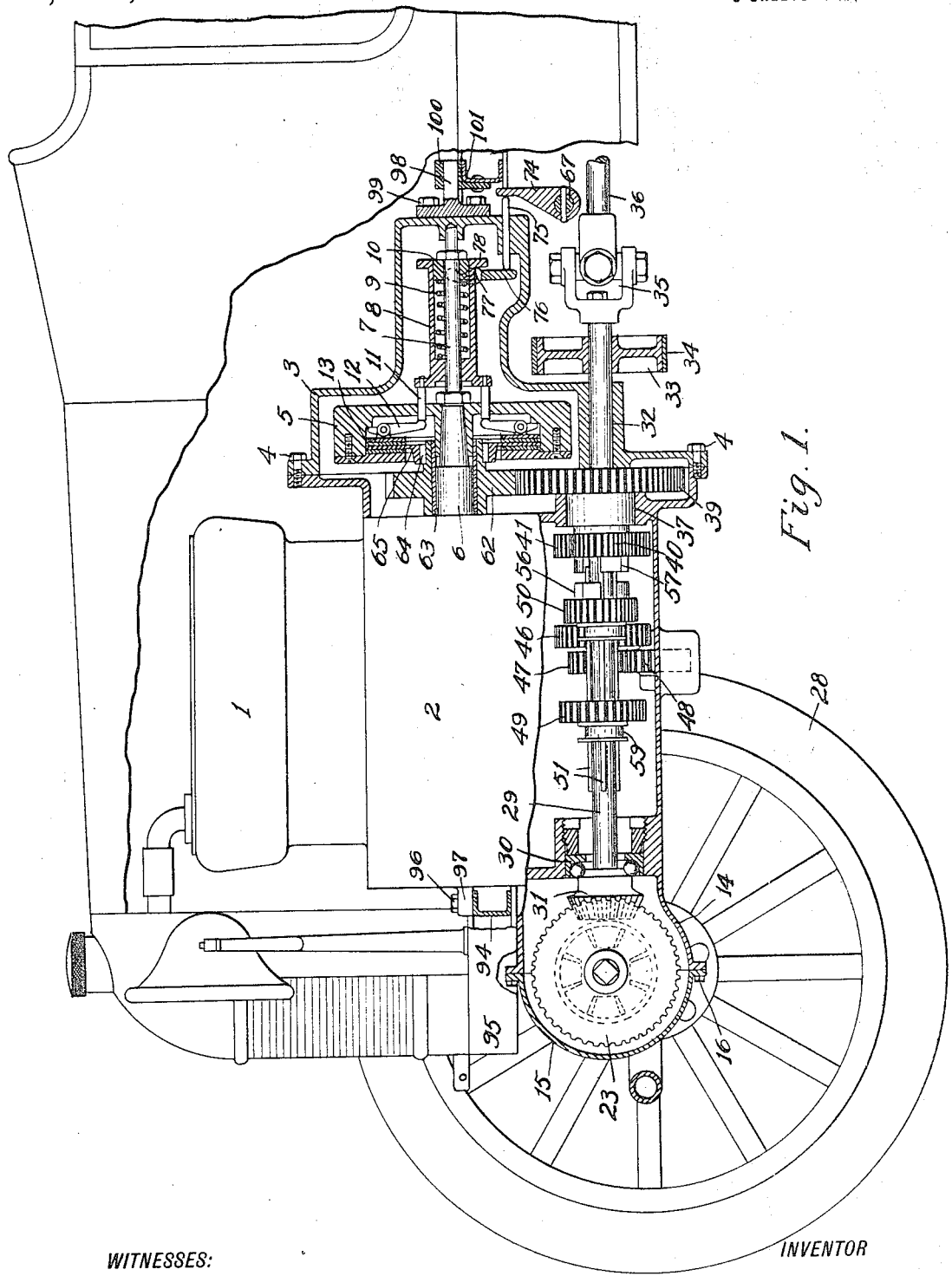

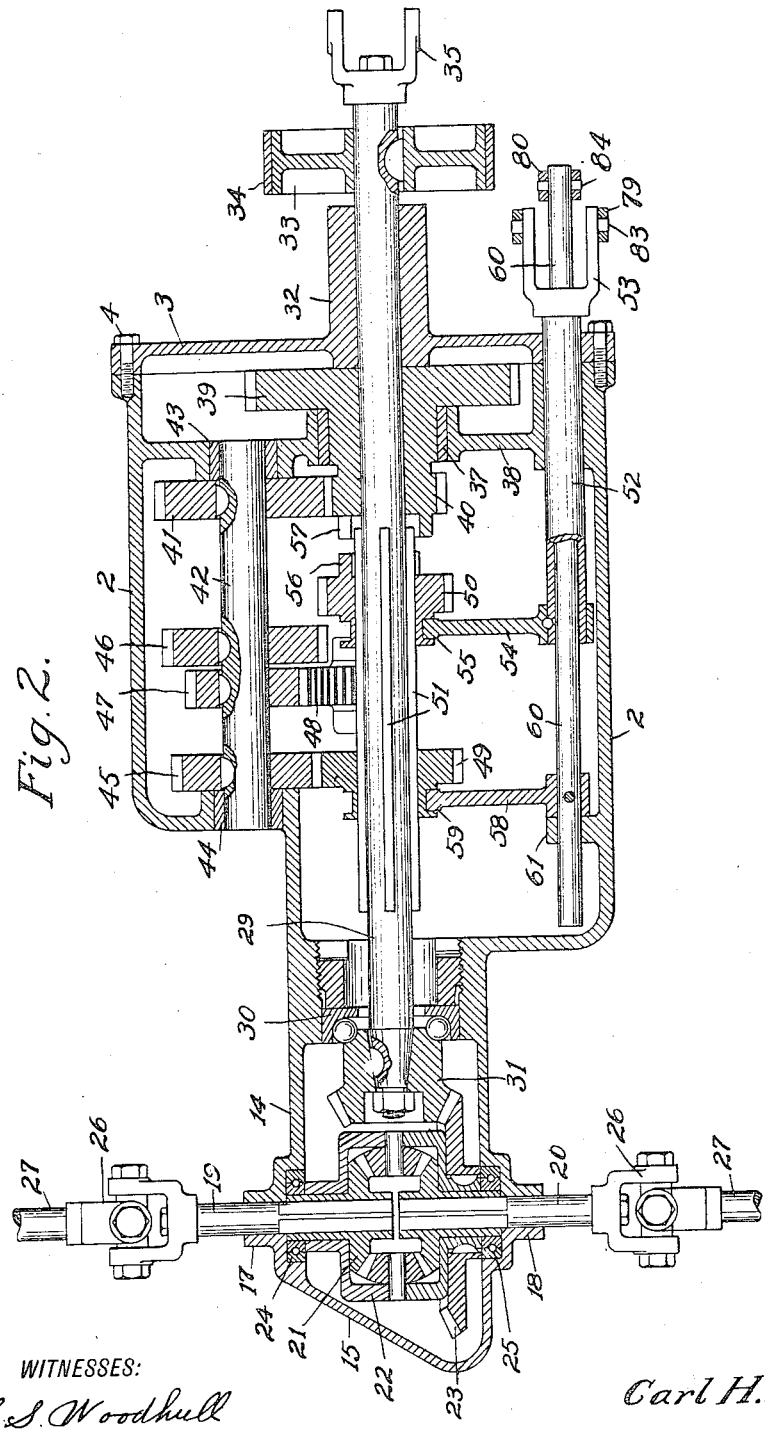

1,211,531.

Patented Jan. 9, 1917.
3 SHEETS—SHEET 3.

WITNESSES:
L. S. Woodhull
M. E. Broesamle

INVENTOR
Carl H. Blomstrom
BY
ATTORNEY

UNITED STATES PATENT OFFICE.

CARL H. BLOMSTROM, OF DETROIT, MICHIGAN.

DRIVING MECHANISM FOR MOTOR-VEHICLES.

1,211,531.   Specification of Letters Patent.   Patented Jan. 9, 1917.

Application filed August 11, 1915. Serial No. 45,072.

*To all whom it may concern:*

Be it known that I, CARL H. BLOMSTROM, a citizen of the United States, residing at Detroit, in the county of Wayne, State of Michigan, have invented certain new and useful Improvements in Driving Mechanisms for Motor-Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to driving mechanism for motor vehicles, and consists in the novel features of construction and arrangement of parts as hereinafter set forth and claimed.

A principal object of the invention is the provision of an improved power plant for driving motor vehicles, in which practically all of the elements comprised in the power generating and transmitting mechanism, such as engine, transmission, differential gearing, clutch mechanism and change speed control usually employed and distributed upon the chassis of a motor vehicle, may be so grouped and assembled in such compact relation with the engine as to enable the parts to be coöperatively combined as a whole in a single inclosing case in the form of a "power unit."

The invention further contemplates the attainment of advantages in the present construction through the novel arrangement and disposition of the transmission or change speed gear and power shaft whereby this shaft is rendered accessible and adapted for driving connection at opposite ends respectively with both or either set of the forward or rear wheels of the vehicle, provision being made for driving the front or steering wheels direct from the forward end of the shaft through differential gearing contained within the engine case and connected through universally jointed shafts with the front wheels, while the rear wheels may be driven in the usual way through a driving shaft universally coupled to the rear end of the power shaft.

Figure 4:
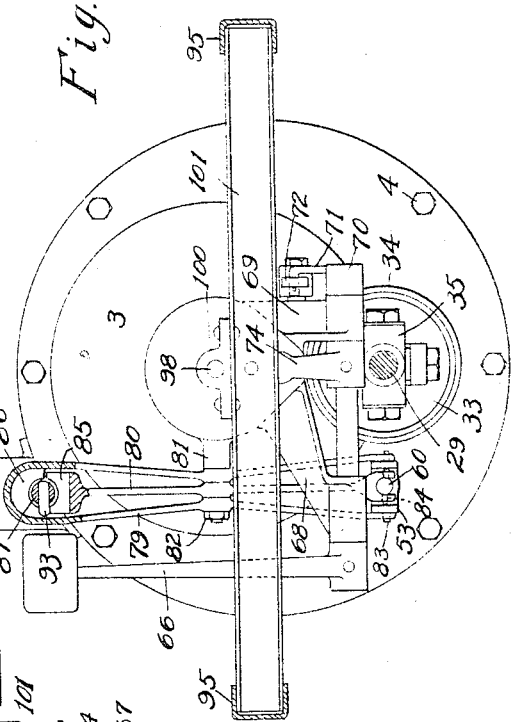
Figure 3:
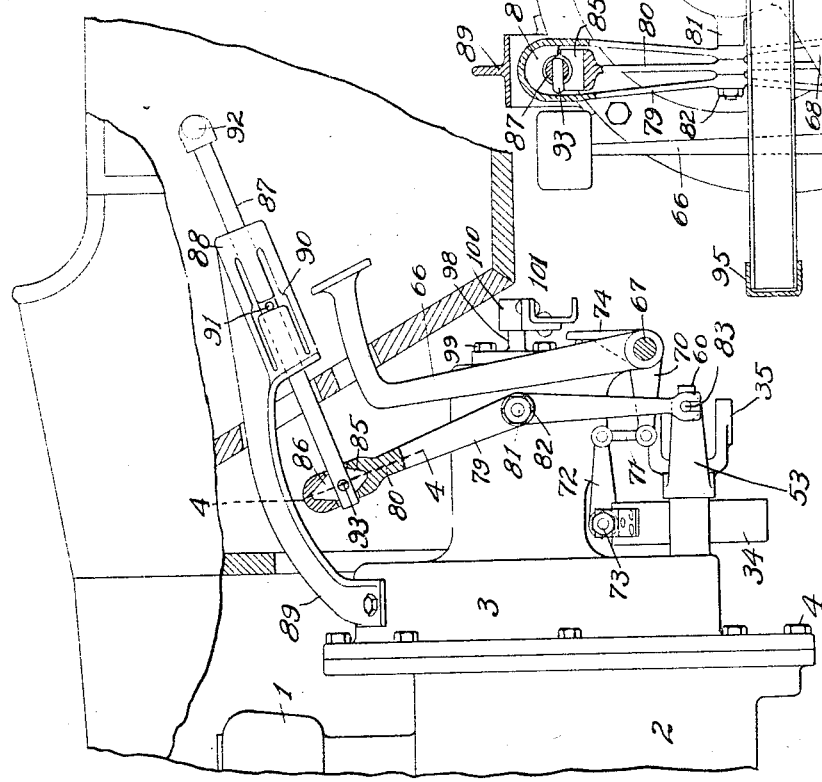

Further advantages will appear from the following description of the invention, which consists in the special and novel features of construction and arrangement of parts, a preferred form of embodiment of which is illustrated in the accompanying drawings, and in which, Figure 1 is a side elevation of the forward portion of a motor vehicle partly in vertical longitudinal section, showing the engine with clutch, transmission and differential gearing grouped and contained within the engine casing. Fig. 2 is an enlarged longitudinal section through the engine casing showing the change speed gearing and power shaft connected through differential gearing with flexible shaft sections for driving the front wheels. Fig. 3 is a fragmentary sectional elevation of the rear portion of the engine, showing the combined clutch and brake pedal and the transmission gear shift lever and selective control rod. Fig. 4 is a sectional end elevation of the parts shown in Fig. 3, the gear shift levers, control rod and supporting arm being shown in section on dotted line 4—4 of Fig. 3.

Referring to the parts by the characters of reference marked on the several views of the drawings, 1 indicates an engine having a casing 2 formed with and depending from the base thereof. The rear end of the casing is extended by a cylindrical casing 3 secured thereto by bolts 4 through flanges on the meeting parts and incloses the fly wheel 5 which is mounted on the crank shaft 6 of the engine. A reduced extension 7 of this shaft is journaled in the end of the casing 3 and carries a clutch barrel 8 containing a coiled spring 9 embracing said shaft and confined against a collar 10 thereon for exerting axial tension on said barrel. The inner end of this barrel carries push pins 11 which extend through the fly wheel 5 and engage the ends of clutch levers 12 for actuating a common form of disk-clutch 13 contained within said fly wheel, as shown in Fig. 1.

The forward end of the casing 2 has an extension 14 formed thereon provided with a closure 15 secured thereto by bolts 16 passing through flanges formed on the meeting parts, and journaled in bearings 17 and 18 formed in opposite walls of this extension are shaft sections 19 and 20, respectively, the inner ends of which are connected by a common form of differential gearing 21 contained within a housing 22 carrying a master beveled gear 23, and which is journaled at opposite ends in bearings 24 and 25, respectively, mounted in opposite sides of the extension of said casing. The outer end of each of the shaft sections 19 and 20 is connected by a universally jointed coupling 26 with the end of a shaft section 27, each of which is adapted to be connected in driving engagement by any well known or suitable means with a front wheel 28 of the vehicle. (See Figs. 1 and 2.)

The main shaft 29 through which the power is transmitted to the differential gearing is journaled at its forward end in a bearing 30 contained in the extension 14 of the casing and carries rigidly mounted thereon a beveled pinion 31 which meshes with the master gear 23 of the differential. The rear end of this shaft extends through and is journaled in a bearing 32 formed on the rear extension 3 of said casing, exteriorly of which it carries a brake drum 33 embraced by a band 34, and is shown as provided with a universal joint 35 which may be coupled to the usual shaft section 36 leading from the rear axle, not shown, by means of which the rear wheels may be driven in conjunction with the front wheels of the vehicle, which may be desirable where the mechanism is to be employed on trucks, tractors or commercial vehicles.

Embracing the main shaft 29 and journaled in a bearing 37 formed through a transverse rib or wall 38 in the casing 2, is a main gear 39 carrying a pinion 40 in mesh with a gear 41 keyed on a countershaft 42 which is journaled at one end in a bearing 43 in the wall 38 and at its opposite end in a bearing 44 in the wall of the casing 2. This shaft extends parallel with the main shaft and carries keyed thereon the usual series of transmitting gears 45, 46 and 47 of varying sizes including a reversing gear 48 journaled in the casing in mesh with the gear 47. Through these gears motion is transmitted from the shaft 42 to the main shaft 29 at variable speeds and in forward and reverse directions, by means of a set of sliding gears 49 and 50 which are secured by keys or splines 51 to rotate with and move axially on said main shaft. A sleeve 52 having a coupling yoke 53 at its outer end is fitted to slide through a bearing 54 in the wall 38 of the casing and carries fixed at its inner end an arm 54 which engages in a peripheral groove 55 in the hub at one side of the gear 50 on the opposite face of which is formed a series of clutch jaws 56 adapted to interlock with registering jaws 57 on the meeting face of the pinion 40, whereby, through the longitudinal movement of the sleeve 52, said gear may be shifted in one direction to interlock the clutch jaws and establish a direct driving engagement with the main shaft and in the opposite direction to mesh said gear with the gear 46 and drive said shaft at a reduced or intermediate speed. The sliding gear 49 which is adapted to mesh with the gear 45 for transmitting low speed to the main shaft and with the gear 48 for reversing the drive of said shaft, is moved by an arm 58 which engages a peripheral groove 59 in the hub of said gear and is fixedly carried by a shaft 60 slidably extended through the sleeve 52 and supported at its inner end in a bearing 61 projecting from the wall of the casing 2, all of which is clearly shown in Fig. 2.

Power is transmitted from the engine to the main gear 39 through a pinion or gear 62 which meshes therewith and is journaled on a bushing 63 embracing the engine shaft 6, and keyed as at 64 to the hub of this gear is a disk 65 which is embraced between the plates or disks of the clutch 13, being normally held in driving engagement therewith by the pressure of the spring in the clutch barrel 8.

To provide means for releasing the clutch from driving engagement with the disk 65 and for applying a brake to the main shaft which may be compactly arranged and carried on the engine casing, I employ, as shown in Figs. 3 and 4, a clutch pedal 66 fixed on one end of a transverse rock shaft 67 which is mounted in bearing arms 68 and 69 on the extension 3 of the casing and carries at its opposite end a crank arm 70 coupled by a link 71 to the end of a brake lever 72 which is pivotally connected at 73 to the ends of the brake band 34 and is suitably arranged for contracting said band upon the drum 33 of the main shaft. Said shaft 67 also carries a lever arm 74 which engages the outer end of a stem 75 extending through the end of the casing extension 3, and which engages at its inner end with a forked lever 76 pivoted at 77 within said casing, the fork of which embraces the clutch barrel 8 and engages a flange 78 on the end of said barrel, whereby, through the forward movement of said pedal, movement will be imparted through the arm 74 to swing the lever 77 and withdraw the drum against the tension of its spring to release the clutch from engagement. Following the release of the clutch the further forward movement of the pedal will, through the swinging of the arm 70 actuate the brake lever 72 to contract the band 34 upon the drum 33 and apply a brake to the main shaft.

As a means for providing a selective control for shifting the gears which may be mounted upon the casing and so disposed as to be conveniently accessible for operation by the driver, I employ, as shown in Figs. 3 and 4, a pair of levers 79 and 80, the former of which is looped in the form of a yoke and embraces the latter between its sides midway the ends at which point said levers are pivoted upon a stem 81 projecting laterally from the extension 3 of the casing, being secured thereon by a lock nut 82. The lower free ends of the yoked lever 79 are forked and pass astride laterally projecting pivot studs 83 in the ends of the coupling yoke 53 of the gear shifting sleeve 52. The lever 80 is also forked at its lower end and passes astride and receives a pivot stud 84 extended through the end of the gear shifting shaft 60, and formed in the upper end of this lever is a transverse V-shaped depression 85 which normally registers with a reversely opposed V-shaped depression 86 formed in the inner upper end portion of the lever 79. Extending through and lying between the depressions 85 and 86 in the ends of these levers is a control rod 87 which is rotatively and slidably extended through a sleeve 88 carried by a bracket arm 89 rigidly mounted on the casing extension 3.

Formed through the wall of the sleeve 88 is an H-shaped aperture 90 and extending therethrough and anchored in the rod 87 is a pin 91 normally lying in the cross portion of the aperture in which it retains the rod against axial movement but permits a partial rotation thereof in either direction to carry said pin into the side portion of said aperture wherein it travels with and limits the longitudinal movement of said rod. On the upper end of the rod 87 is a handle 92 by which it may be operated, and projecting laterally at one side of this rod near its lower end is a pin 93 which normally lies disengaged between and in alinement with the depressions 85 and 86 with which it is adapted to engage alternately through the partial rotation in either direction of the control rod, by which an operative connection may be selectively established with either of the levers 79 and 80 for imparting a swinging movement thereto through the longitudinal movement of said rod to actuate the sleeve or rod controlling the sliding gears and shift said gears to vary the speed of the main or driving shaft. The engine and casing thus equipped with the power transmitting and control mechanism is mounted at its forward end upon a cross member 94 of the main frame 95, being secured thereto by bolts 96 through lugs 97 formed on the engine bed or casing, and the rear end is carried upon a trunnion 98 secured by bolts 99 to the end of the casing extension 3 and which is journaled in a bearing 100 secured to a cross rail 101 of the main frame. By this means a three point suspension is provided for carrying the engine together with the component parts of the power mechanism in a single unit, in which the true working alinement of the operating parts will not be affected by the warping strains to which the frame of the vehicle is necessarily subjected, and a compact and conveniently accessible grouping of the parts is effected enabling the application of driving connections for the distribution of power from either end of the main or driving shaft.

I claim:

1. In a driving mechanism for motor vehicles, a frame, an engine having a casing in the base thereof mounted on said frame, power transmission gearing and differential driving mechanism mounted in said casing, a main shaft journaled in said casing beneath said engine in driving engagement at one end with said differential driving mechanism and extending at its opposite end through the wall of said casing, change speed gears slidably carried on said shaft and engageable with said transmission gearing, and controlling means mounted on said casing and operatively associated with actuating means for engaging and disengaging said change speed gears with said transmission gearing.

2. In a driving mechanism for motor vehicles, a frame, an engine having a casing depending from the base thereof mounted on said frame, power transmission gearing and differential driving mechanism mounted in said casing, a main shaft journaled in said casing beneath said engine to extend therefrom at one end and having a gear at its opposite end engaged with said differential mechanism, slidable gears on said shaft for effecting a driving engagement with said transmission gearing, a coupling connection on said shaft exterior of said casing, and controlling means mounted on said casing and adapted for selective connection with actuating means for engaging and disengaging said slidable gears with said transmission gearing.

3. In a driving mechanism for motor vehicles, a frame, an engine having a depending casing formed on the base thereof and mounted on said frame, power transmission gearing and differential driving mechanism mounted in said casing, a main shaft journaled in said casing to extend therethrough at one end beneath and at the rear of said engine and having a gear at its opposite end engaged with said differential mechanism, slidable gears on said shaft movable into and out of driving engagement with said power transmission gearing, a coupling connection on said shaft exterior of said casing, means carried on the shaft of said engine and operatively connected with actuating means mounted on said casing for effecting a driving engagement with said transmission gearing, and controlling means mounted on said casing and adapted for selective connection with actuating means engaging said slidable gears for imparting movement to engage and disengage said gears with said transmission gearing.

4. In a driving mechanism for motor vehicles, a frame, an engine having a casing inclosing the base thereof mounted on said frame, power transmission gearing mounted in said casing and connected in driving engagement with a releasing clutch carried on the shaft of said engine, differential driving mechanism mounted in said casing and carrying shaft sections adapted for driving connection with the wheels of the vehicle, a main shaft journaled in said casing beneath said engine to extend therethrough at one end and having a gear at its inner end in mesh with said differential mechanism, change speed gears mounted on said shaft and adapted for driving engagement with said transmission gearing, brake mechanism carried on said shaft exteriorly of said casing, means mounted on said casing and connected with actuating means for releasing said clutch and for operating said brake mechanism.

5. In a driving mechanism for motor vehicles, a frame, an engine having a casing depending therefrom mounted on said frame, power transmission gearing mounted in said casing in driving engagement with a releasing clutch carried on the shaft of said engine, differential driving mechanism mounted in said casing and carrying flexible shaft sections adapted for driving connection with the front wheels of the vehicle, a main shaft carrying variable driving gear adapted for engagement with said transmission gearing journaled in said casing beneath said engine in driving engagement at one end with said differential mechanism and extending through the rear of said casing at its opposite end, a coupling connection and a brake drum mounted on said shaft exteriorly of said casing, a brake band embracing said drum and connected with actuating means mounted on said casing for contracting said band upon said drum.

6. In a driving mechanism for motor vehicles, a power unit comprising an engine having a casing containing transmission gearing connected in driving engagement with a releasing clutch on the shaft of said engine, differential gearing journaled in said casing and carrying flexible shaft sections adapted for driving connection with the wheels of the vehicle, a main shaft having a gear at one end in mesh with said differential gearing and journaled to extend through said casing at its opposite end, change speed gears splined on said shaft and movable into and out of engagement with said transmission gearing, slidable members extending into said casing and loosely connected with said change speed gears, levers pivotally supported on said casing and connected at corresponding ends to the ends of said slidable members, a control rod journaled to rock and to slide in a sleeve mounted on said casing and having a guide stem engaging an angular aperture in said lever for limiting the rocking and sliding movement of said rod therein, a projection on said rod through the rocking movement of which a pivotal connection is selectively established with said levers for imparting a swinging movement thereto through the sliding of said rod to actuate said slidable members and shift said change speed gears.

7. In a driving mechanism for motor vehicles, a power unit comprising an engine having a casing containing power transmission gearing connected in driving engagement with a releasing clutch on the shaft of said engine, differential gearing journaled in said casing and carrying shaft sections adapted for connection with the wheels of the vehicle, a main shaft having a gear at one end in mesh with said differential gearing and journaled beneath said engine to extend through said casing at its opposite end, change speed gears splined on said shaft and movable into and out of engagement with said transmission gearing, slidable members extending into said casing and loosely embracing said change speed gears, control mechanism mounted on said casing and operatively arranged for selective engagement with said slidable members for imparting movement thereto to shift said change speed gears, brake mechanism mounted on said main shaft exteriorly of said casing, a clutch pedal mounted on said casing and operatively connected with actuating means for releasing said clutch and for operating said brake mechanism.

8. In a driving mechanism for motor vehicles, a power unit comprising an engine having a casing containing transmission gearing connected in driving engagement with a spring tensioned releasing clutch on the shaft of said engine, differential gearing journaled in said casing and carrying flexible shaft sections adapted for connection with the front wheels of the vehicle, a main shaft having a gear at one end in mesh with said differential gearing and journaled to extend through said casing at its opposite end, change speed gears splined on said shaft within said casing and movable thereon for engagement with said transmission gearing, slidable members extending into said casing and loosely embracing said change speed gears, actuating levers pivotally supported on said casing and pivotally connected at corresponding ends to the ends of said slidable members, a control rod journaled to rock and to slide in a sleeve mounted on said casing and having a guide stem engaging an H-shaped aperture in said sleeve for limiting the rocking and sliding movement of said rod therein, a projection on the end of said rod pivotally engageable selectively by a rocking movement thereof with said levers for imparting a swinging movement thereto through the longitudinal movement of said rod to actuate said slidable members and shift said change speed gears, a coupling connection and brake mechanism mounted on said main shaft exteriorly of said casing, a clutch pedal pivoted on said casing and connected with actuating means coupled to said brake mechanism and engaging said clutch for actuating said brake mechanism and for releasing said clutch.

In testimony whereof, I sign this specification.

CARL H. BLOMSTROM.